US012763265B2

(12) United States Patent
Habu et al.

(10) Patent No.: US 12,763,265 B2
(45) Date of Patent: Oct. 13, 2026

(54) SOLID ELECTROLYTIC CAPACITOR AND CAPACITOR ARRAY FOR SUPPRESSING DELAMINATION

(71) Applicant: Murata Manufacturing Co., Ltd., Nagaokakyo (JP)

(72) Inventors: Daiki Habu, Nagaokakyo (JP); Takeshi Furukawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 155 days.

(21) Appl. No.: 18/797,629

(22) Filed: Aug. 8, 2024

(65) Prior Publication Data

US 2024/0395470 A1 Nov. 28, 2024

Related U.S. Application Data

(63) Continuation of application No. PCT/JP2023/003893, filed on Feb. 7, 2023.

(30) Foreign Application Priority Data

Feb. 16, 2022 (JP) ................................ 2022-022020

(51) Int. Cl.
*H01G 9/048* (2006.01)
*H01G 9/07* (2006.01)
(Continued)

(52) U.S. Cl.
CPC ............... *H01G 9/048* (2013.01); *H01G 9/07* (2013.01); *H01G 9/15* (2013.01); *H01G 9/26* (2013.01)

(58) Field of Classification Search
CPC .. H01G 9/08; H01G 9/26; H01G 9/15; H01G 9/07; H01G 9/048
See application file for complete search history.

(56) References Cited

U.S. PATENT DOCUMENTS

2010/0110614 A1* 5/2010 Umemoto ................ H01G 9/15 361/525
2013/0233605 A1* 9/2013 Hsu .......................... H01G 9/04 174/260
(Continued)

FOREIGN PATENT DOCUMENTS

JP 2006165152 A * 6/2006
JP 2007173439 A * 7/2007 ............... H01G 9/28
(Continued)

OTHER PUBLICATIONS

International Search Report received for PCT Patent Application No. PCT/JP2023/003893, mailed on Apr. 18, 2023, 2 pages (English Translation Only).

*Primary Examiner* — David M Sinclair
(74) *Attorney, Agent, or Firm* — ArentFox Schiff LLP

(57) ABSTRACT

A solid electrolytic capacitor including: an anode plate having a porous layer on at least one main surface thereof; a dielectric layer on the porous layer; a cathode layer on the dielectric layer, the cathode layer including a solid electrolyte layer on the surface of the dielectric layer, and a conductor layer on a surface of the solid electrolyte layer, and the solid electrolyte layer including a first solid electrolyte layer in a region including an inside of pores of the dielectric layer, and a second solid electrolyte layer covering the first solid electrolyte layer; a mask layer made of an insulating material and located in a region surrounding the cathode layer at a peripheral edge of the porous layer; and a columnar layer made of an insulating material and located at a distance from the mask layer in a region surrounded by the cathode layer in the porous layer.

16 Claims, 7 Drawing Sheets

(51) Int. Cl.
*H01G 9/15* (2006.01)
*H01G 9/26* (2006.01)

(56) References Cited

U.S. PATENT DOCUMENTS

| | | | | |
|---|---|---|---|---|
| 2019/0362904 | A1* | 11/2019 | Furukawa | H01G 9/04 |
| 2020/0312576 | A1* | 10/2020 | Furukawa | H01G 9/26 |
| 2020/0402723 | A1* | 12/2020 | Furukawa | H01G 9/012 |
| 2023/0067888 | A1 | 3/2023 | Sundaram et al. | |
| 2023/0073898 | A1 | 3/2023 | Shafiei et al. | |

FOREIGN PATENT DOCUMENTS

| | | | |
|---|---|---|---|
| JP | 2008-130722 | A | 6/2008 |
| JP | 2009-004417 | A | 1/2009 |
| JP | 2018-129437 | A | 8/2018 |
| WO | 2021/158879 | A1 | 8/2021 |

* cited by examiner

SOLID ELECTROLYTIC CAPACITOR AND CAPACITOR ARRAY FOR SUPPRESSING DELAMINATION

CROSS REFERENCE TO RELATED APPLICATIONS

The present application is a continuation of International application No. PCT/JP2023/003893, filed Feb. 7, 2023, which claims priority to Japanese Patent Application No. 2022-022020, filed Feb. 16, 2022, the entire contents of each of which are incorporated herein by reference.

TECHNICAL FIELD

The present disclosure relates to a solid electrolytic capacitor and a capacitor array.

BACKGROUND ART

Patent Document 1 discloses a solid electrolytic capacitor including a valve metal base body having a porous layer on a surface thereof and having a dielectric film formed on a wall surface of the porous layer, and a solid electrolyte layer provided on the dielectric film, in which the solid electrolyte layer has an inner layer that penetrates the porous layer and an outer layer that is formed on the inner layer and of which at least a part thereof penetrates the porous layer.

Patent Document 1: Japanese Unexamined Patent Application Publication No. 2018-129437

SUMMARY OF THE DISCLOSURE

In the solid electrolytic capacitor in the related art, such as the solid electrolytic capacitor disclosed in Patent Document 1, which is configured with layers of a plurality of different materials, thermal stress is likely to be generated due to a difference in thermal characteristics such as a coefficient of linear expansion of each layer when heat treatment is performed. In particular, in the solid electrolytic capacitor in the related art, thermal stress is likely to be applied between the porous layer and the solid electrolyte layer due to a difference in thermal characteristics such as a coefficient of linear expansion between the porous layer and the solid electrolyte layer. As a result, in the solid electrolytic capacitor in the related art, the flexible porous layer is likely to be deformed, and thus delamination between the porous layer and the solid electrolyte layer is likely to occur.

The present disclosure has been made in order to solve the above-described problem, and an object thereof is to provide a solid electrolytic capacitor capable of suppressing occurrence of delamination. Another object of the present disclosure is to provide a capacitor array including the solid electrolytic capacitor.

A solid electrolytic capacitor of the present disclosure includes: an anode plate having a porous layer on at least one main surface thereof; a dielectric layer on a surface of the porous layer; a cathode layer on a surface of the dielectric layer, wherein the cathode layer includes a solid electrolyte layer on the surface of the dielectric layer, and a conductor layer on a surface of the solid electrolyte layer, and the solid electrolyte layer includes a first solid electrolyte layer in a region including an inside of pores of the dielectric layer, and a second solid electrolyte layer covering the first solid electrolyte layer; a mask layer made of a first insulating material and located in a region surrounding the cathode layer at a peripheral edge of the porous layer; and a columnar layer made of a second insulating material and located at a distance from the mask layer in a region surrounded by the cathode layer in the porous layer.

The capacitor array of the present disclosure includes a plurality of the solid electrolytic capacitors of the present disclosure.

According to the present disclosure, it is possible to provide a solid electrolytic capacitor in which the occurrence of delamination can be suppressed. In addition, according to the present disclosure, it is possible to provide a capacitor array including the solid electrolytic capacitor.

DESCRIPTION OF THE PREFERRED EMBODIMENTS

Hereinafter, a solid electrolytic capacitor of the present disclosure and a capacitor array according to the present disclosure will be described. The present disclosure is not limited to the following configurations, and may be modified as appropriate without departing from the gist of the present disclosure. In addition, the present disclosure also includes a combination of a plurality of individual preferred configurations described below.

Each embodiment shown below is an example, and it goes without saying that partial replacement or combination of configurations shown in different embodiments is possible. In Embodiment 2 and subsequent embodiments, descriptions of matters common to Embodiment 1 will be omitted, and different points will be mainly described. In particular, similar actions and effects due to similar configurations will not be mentioned sequentially for each embodiment.

In the following description, when each embodiment is not particularly distinguished, the embodiments are simply referred to as "solid electrolytic capacitor according to the present disclosure" and "capacitor array according to the present disclosure".

The drawings shown below are schematic views, and the dimensions, aspect ratios, and the like may differ from an actual product.

Embodiment 1

A solid electrolytic capacitor of the present disclosure includes an anode plate having a porous layer on at least one main surface, a dielectric layer provided on a surface of the porous layer, a cathode layer provided on a surface of the dielectric layer, a mask layer made of an insulating material and provided on the peripheral edge of the porous layer in a region surrounding the cathode layer, and a columnar layer made of an insulating material and provided at a distance from the mask layer in a region surrounded by the cathode layer in the porous layer. In the solid electrolytic capacitor of the present disclosure, the cathode layer includes a solid electrolyte layer provided on the surface of the dielectric layer and a conductor layer provided on a surface of the solid electrolyte layer. In the solid electrolytic capacitor of the present disclosure, the solid electrolyte layer includes a first solid electrolyte layer provided in a region including the inside of the pores of the dielectric layer and a second solid electrolyte layer covering the first solid electrolyte layer.

Hereinafter, an example of the solid electrolytic capacitor of the present disclosure will be described as a solid electrolytic capacitor according to Embodiment 1 of the present disclosure.

Figure 1:
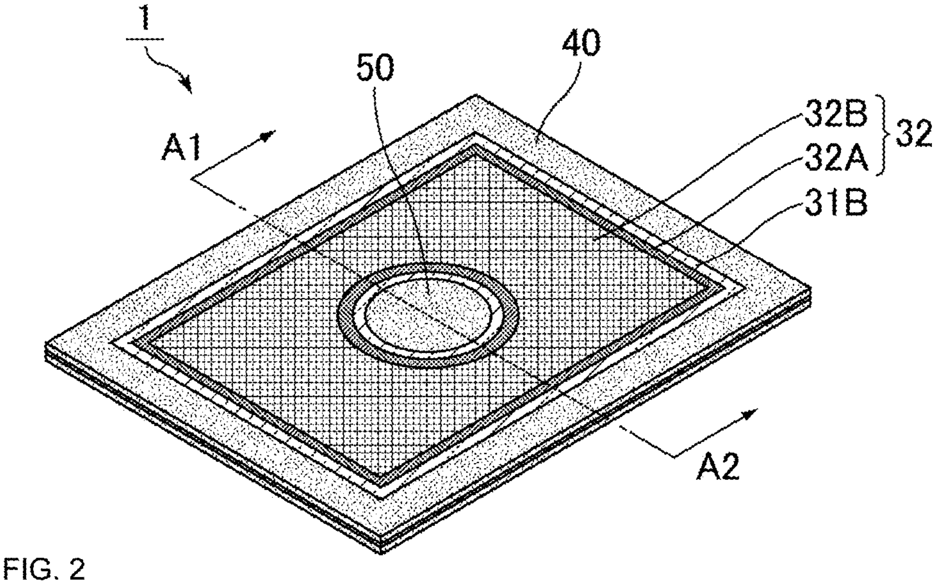
FIG. 1 is a schematic perspective view showing an example of a solid electrolytic capacitor of Embodiment 1 of the present disclosure.
Figure 2:
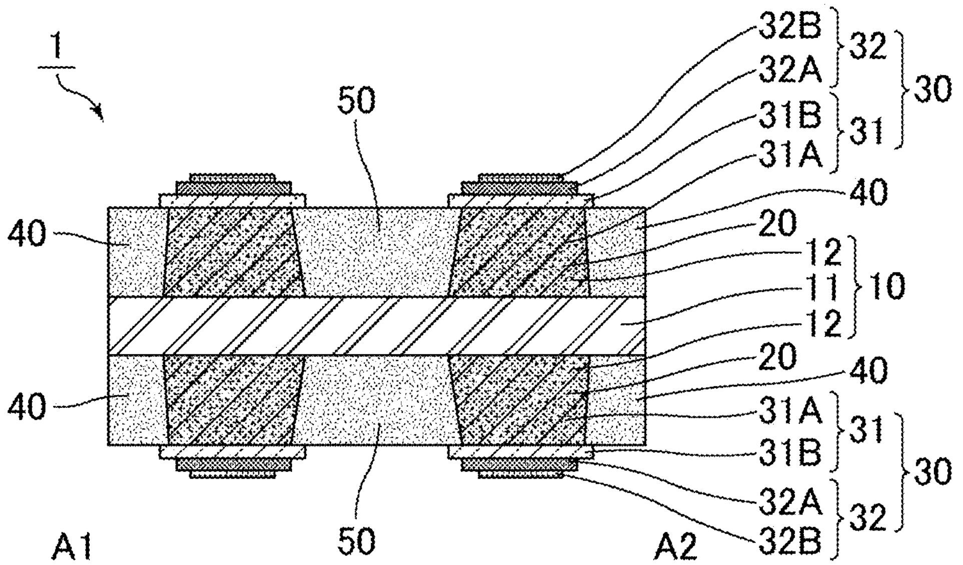
FIG. 2 is a schematic cross-sectional view showing an example of a cross section taken along a line segment A1-A2 of the solid electrolytic capacitor shown in FIG. 1.

FIG. 1 is a schematic perspective view showing an example of the solid electrolytic capacitor of Embodiment 1 of the present disclosure. FIG. 2 is a schematic cross-sectional view showing an example of a cross section taken along the line segment A1-A2 of the solid electrolytic capacitor shown in FIG. 1.

A solid electrolytic capacitor 1 shown in FIGS. 1 and 2 includes an anode plate 10, a dielectric layer 20, a cathode layer 30, a mask layer 40, and a columnar layer 50.

The anode plate 10 includes a core portion 11 and a porous layer 12.

In the present specification, the term "plate" includes a "sheet", a "foil", a "film", and the like, and these are not distinguished from each other by thickness.

The core portion 11 is made of a metal, and is preferably made of a valve metal. When the core portion 11 is made of a valve action metal, the anode plate 10 is also referred to as a valve metal base body.

Examples of the valve metal include a single metal such as aluminum, tantalum, niobium, titanium, or zirconium, and an alloy containing at least one of these single metals. Among these metals, aluminum or an aluminum alloy is preferable.

The porous layer 12 is provided on at least one main surface of the core portion 11. That is, the porous layer 12 may be provided only on one main surface of the core portion 11 or may be provided on both main surfaces of the core portion 11 as shown in FIG. 2. As described above, the anode plate 10 includes the porous layer 12 on at least one main surface. As a result, since the surface area of the anode plate 10 increases, the capacitance of the solid electrolytic capacitor 1 is likely to be improved.

The porous layer 12 is preferably an etching layer in which the surface of the anode plate 10 is etched.

The shape of the anode plate 10 is preferably a flat plate shape and more preferably a foil shape. In the present specification, the term "plate-like" also includes "foil-like". In addition, in the present specification, "plate-like" also includes "sheet-like", "film-like", and the like.

The dielectric layer 20 is provided on the surface of the porous layer 12. More specifically, the dielectric layer 20 is provided along the surface (contour) of each pore present in the porous layer 12.

The dielectric layer 20 is preferably made of the above-mentioned oxide film of a valve metal. For example, when the anode plate 10 is an aluminum foil, an anodization treatment (also referred to as a chemical treatment) is performed on the anode plate 10 in an aqueous solution containing ammonium adipate or the like, whereby an oxide film that becomes the dielectric layer 20 is formed. Since the dielectric layer 20 is formed along the surface of the porous layer 12, the dielectric layer 20 is provided with pores (concave portions).

The cathode layer 30 is provided on the surface of the dielectric layer 20. More specifically, the cathode layer 30 is provided in a region surrounded by the mask layer 40 on the surface of the dielectric layer 20.

The cathode layer 30 includes a solid electrolyte layer 31 provided on the surface of the dielectric layer 20 and a conductor layer 32 provided on the surface of the solid electrolyte layer 31.

The solid electrolyte layer 31 includes a first solid electrolyte layer 31A provided in a region including the inside of the pores of the dielectric layer 20 and the second solid electrolyte layer 31B covering the first solid electrolyte layer 31A.

The first solid electrolyte layer 31A may be provided only inside the pores of the dielectric layer 20 or may be provided to extend to the outside of the pores of the dielectric layer 20 while filling the inside of the pores of the dielectric layer 20.

It is preferable that the second solid electrolyte layer 31B is provided to cover the first solid electrolyte layer 31A and cover the pores of the dielectric layer 20.

When the second solid electrolyte layer 31B is provided to cover the pores of the dielectric layer 20, the second solid electrolyte layer 31B may be provided to penetrate the inside of the pores of the dielectric layer 20 or need not be provided to penetrate the inside of the pores of the dielectric layer 20.

When the second solid electrolyte layer 31B covers the pores of the dielectric layer 20 and penetrates an inside of the pores of the dielectric layer 20, the contact area between the second solid electrolyte layer 31B and the dielectric layer 20 increases, and further the occurrence of delamination between the porous layer 12 and the solid electrolyte layer 31 is likely to be suppressed by the anchor effect of the second solid electrolyte layer 31B.

Examples of the constituent material of the solid electrolyte layer 31, more specifically, the constituent materials of the first solid electrolyte layer 31A and the second solid electrolyte layer 31B include conductive polymers such as polypyrroles, polythiophenes, and polyanilines. Among conductive polymers, polythiophenes are preferable, and poly(3,4-ethylenedioxythiophene) (PEDOT) is particularly preferable. In addition, the conductive polymer may contain a dopant such as polystyrene sulfonic acid (PSS).

The constituent materials of the first solid electrolyte layer 31A and the second solid electrolyte layer 31B may be the same as or different from each other.

The first solid electrolyte layer 31A is formed in a predetermined region including the inside of the pores of the dielectric layer 20 by, for example, a method of coating the surface of the dielectric layer 20 with a dispersion liquid of a conductive polymer such as poly(3,4-ethylenedioxythiophene) and drying the dispersion liquid, or a method of forming a polymer film of poly(3,4-ethylenedioxythiophene) on the surface of the dielectric layer 20 by using a treatment liquid containing a polymerizable monomer such as 3,4-ethylenedioxythiophene.

The second solid electrolyte layer 31B is formed in a predetermined region covering the first solid electrolyte layer 31A by, for example, a method of applying a dispersion liquid of a conductive polymer such as poly(3, 4-ethylenedioxythiophene) to a surface of the first solid electrolyte layer 31A and drying the dispersion liquid, or a method of forming a polymer film of poly(3, 4-ethylenedioxythiophene) or the like on the surface of the first solid electrolyte layer 31A by using a treatment liquid containing a polymerizable monomer such as 3,4-ethylenedioxythiophene.

In the solid electrolytic capacitor of the present disclosure, the conductor layer preferably includes a metal layer containing a metal filler.

The conductor layer 32 preferably includes a metal layer containing a metal filler.

The metal filler is preferably at least one selected from the group consisting of a copper filler, a silver filler, and a nickel filler.

The metal layer may be, for example, a metal plating film or a metal foil. In this case, the metal layer is preferably made of at least one metal selected from the group consisting of copper, silver, nickel, and an alloy containing at least one of these metals as a main component.

In the present specification, the main component means an element component having the highest weight percentage.

Further, the conductor layer 32 preferably contains a conductive resin layer in addition to the metal layer.

Examples of the conductive resin layer include a conductive adhesive layer containing at least one conductive filler selected from the group consisting of a copper filler, a silver filler, a nickel filler, and a carbon filler.

The conductor layer 32 may include only a metal layer, may include only a conductive resin layer, or may include both a metal layer and a conductive resin layer.

In the examples shown in FIGS. 1 and 2, the conductor layer 32 includes a first conductor layer 32A provided on the surface of the second solid electrolyte layer 31B and a second conductor layer 32B provided on the surface of the first conductor layer 32A. In this manner, the conductor layer 32 preferably includes a plurality of kinds of conductor layers.

In the solid electrolytic capacitor, the thickness of the dielectric layer is small, and thus the leakage current is likely to be a problem. On the other hand, in the solid electrolytic capacitor 1, since the conductor layer 32 includes a plurality of kinds of conductor layers such as the first conductor layer 32A and the second conductor layer 32B, a plurality of bulk resistances and interface resistances are present in the cathode layer 30, and thus the leakage current is likely to be suppressed.

The first conductor layer 32A is preferably a conductive resin layer containing a conductive filler.

The second conductor layer 32B is preferably a metal layer containing a metal filler.

The conductor layer 32 may include, for example, a carbon layer as the first conductor layer 32A and a copper layer as the second conductor layer 32B.

The carbon layer is formed in a predetermined region by, for example, applying a carbon paste containing a carbon filler to a surface of the second solid electrolyte layer 31B by a sponge transfer method, a screen printing method, a dispenser coating method, an ink jet printing method, or the like.

The copper layer is formed in a predetermined region by, for example, applying a surface of the carbon layer with a copper paste containing a copper filler by a sponge transfer method, a screen printing method, a spray coating method, a dispenser coating method, an ink jet printing method, or the like.

A solid electrolyte layer different from the first solid electrolyte layer 31A and the second solid electrolyte layer 31B may be interposed between the first conductor layer 32A and the second solid electrolyte layer 31B.

In the solid electrolytic capacitor 1, a capacitor portion is composed of the anode plate 10, the dielectric layer 20, and the cathode layer 30.

The mask layer 40 is made of an insulating material.

Examples of the insulating material constituting the mask layer 40 include a composition consisting of polyphenylsulfone (PPS), polyethersulfone (PES), a cyanate ester resin, a fluororesin (tetrafluoroethylene, a tetrafluoroethylene•perfluoroalkyl vinyl ether copolymer, or the like), soluble polyimide siloxane, and an epoxy resin, a polyimide resin, a polyamideimide resin, and derivatives or precursors thereof.

The mask layer 40 is provided in a region surrounding the cathode layer 30 at the peripheral edge of the porous layer 12.

As shown in FIG. 1, the mask layer 40 is preferably provided on the entire peripheral edge of the porous layer 12. In addition, a region where the mask layer 40 is not provided may be present in a part of the peripheral edge of the porous layer 12.

In the examples shown in FIGS. 1 and 2, the mask layer 40 is provided to extend from the outermost surface of the anode plate 10 toward the inside in the thickness direction.

In the present specification, the thickness direction means a thickness direction of the solid electrolytic capacitor, and is defined in a vertical direction in FIG. 2, for example.

The mask layer 40 may be in contact with the core portion 11 as shown in FIG. 2 or need not be in contact with the core portion 11 in the thickness direction.

When viewed from a cross-section along the thickness direction, the dimension of the mask layer 40 in a direction perpendicular to the thickness direction may be smaller, larger, or constant from the outermost surface of the anode plate 10 toward the inside as shown in FIG. 2.

When viewed from a cross-section along the thickness direction, the dimension of the mask layer 40 in a direction perpendicular to the thickness direction may be smaller at the end portion on the core portion 11 side than at the end portion on the opposite side to the core portion 11, as shown in FIG. 2, or may be larger at the end portion on the core portion 11 side than at the end portion on the opposite side to the core portion 11, or may be same at the end portion on the core portion 11 side and at the end portion on the opposite side to the core portion 11.

The mask layer 40 may be provided outside the porous layer 12 and may or does not need to overlap the cathode layer 30 in the thickness direction.

The mask layer 40 is formed, for example, by applying the outermost surface of the anode plate 10 overlapping the peripheral edge of the porous layer 12 with an insulating material and permeating the insulating material from the outermost surface of the anode plate 10 toward the inside to surround the formation region or the formation scheduled region of the cathode layer 30 at the peripheral edge of the porous layer 12.

The mask layer 40 may be formed at a timing before the dielectric layer 20 with respect to the porous layer 12 or may be formed at a timing after the dielectric layer 20.

The columnar layer 50 is made of an insulating material. Examples of the insulating material constituting the columnar layer 50 include a composition consisting of polyphenylsulfone, polyethersulfone, a cyanic acid ester resin, a fluororesin (tetrafluoroethylene, a tetrafluoroethylene-perfluoroalkyl vinyl ether copolymer, or the like), soluble polyimide siloxane, and an epoxy resin, a polyimide resin, a polyamideimide resin, and derivatives or precursors thereof.

The insulating material constituting the columnar layer 50 is preferably the same as the insulating material constituting the mask layer 40. The insulating material constituting the columnar layer 50 may be different from the insulating material constituting the mask layer 40.

The columnar layer 50 is provided at a distance from the mask layer 40 in a region surrounded by the cathode layer 30 in the porous layer 12. In other words, the columnar layer 50 is provided in a region surrounded by the cathode layer 30 and surrounded by the mask layer 40 in the porous layer 12. In the examples shown in FIGS. 1 and 2, the columnar layer 50 is provided in a substantially central portion of the porous layer 12 when viewed from the thickness direction.

In the solid electrolytic capacitors in the related art, which are composed of layers of a plurality of different materials, for example, when a heat treatment such as a heat solidification treatment when forming a solid electrolyte layer with a thermosetting resin or a reflow treatment when mounting a solid electrolytic capacitor on a substrate is performed, thermal stress is likely to be applied between the porous layer and the solid electrolyte layer due to a difference in thermal characteristics such as a coefficient of linear expansion between the porous layer and the solid electrolyte layer. In this case, the thermal stress applied between the porous layer and the solid electrolyte layer acts as a large contractile force from the peripheral edge of the solid electrolytic capacitor toward the center when viewed from the thickness direction. As a result, in the solid electrolytic capacitor in the related art, the flexible porous layer is likely to be deformed, and thus delamination between the porous layer and the solid electrolyte layer is likely to occur. Delamination between such a porous layer and a solid electrolyte layer is particularly likely to occur when the solid electrolytic capacitor is thin in the thickness direction, and the area of the solid electrolytic capacitor when viewed from the thickness direction is large.

On the other hand, in the solid electrolytic capacitor 1, since the columnar layer 50 is provided, the thermal stress applied between the porous layer 12 and the solid electrolyte layer 31 is divided by the columnar layer 50. More specifically, the thermal stress applied between the porous layer 12 and the solid electrolyte layer 31 acts in a divided manner as stress from the mask layer 40 toward the columnar layer 50 and stress from the columnar layer 50 toward the mask layer 40, when viewed in the thickness direction. As a result, in the solid electrolytic capacitor 1, the thermal stress applied between the porous layer 12 and the solid electrolyte layer 31 is likely to be canceled in a direction from the mask layer 40 to the columnar layer 50 and a direction from the columnar layer 50 to the mask layer 40. Therefore, in the solid electrolytic capacitor 1, the porous layer 12 is less likely to be deformed, and accordingly, delamination between the porous layer 12 and the solid electrolyte layer 31 is less likely to occur. In particular, in the vicinity of the mask layer 40 and the columnar layer 50, delamination between the porous layer 12 and the solid electrolyte layer 31 is less likely to occur. Further, in the solid electrolytic capacitor 1, even when the thickness is small in the thickness direction, the area viewed from the thickness direction is large, or the like, delamination between the porous layer 12 and the solid electrolyte layer 31 is less likely to occur.

In the solid electrolytic capacitor 1, the occurrence of the above-described delamination between the porous layer 12 and the solid electrolyte layer 31 is not the only thing that can be suppressed. For example, in the solid electrolytic capacitor 1, the action of the columnar layer 50 makes it possible to suppress the occurrence of delamination between the solid electrolyte layer 31 and the conductor layer 32 even when the conductor layer 32 includes a metal layer containing a metal filler and a difference in thermal characteristics such as a coefficient of linear expansion between the solid electrolyte layer 31 and the conductor layer 32 may be large.

As described above, in the solid electrolytic capacitor 1, since the solid electrolytic capacitor 1 is composed of layers of a plurality of different materials and the occurrence of delamination between the layers of the plurality of different materials can be suppressed even when there is a difference in thermal characteristics such as a coefficient of linear expansion between the layers.

Further, in the solid electrolytic capacitor 1, since the columnar layer 50 is provided, deformation due to an external force is suppressed.

In the examples shown in FIGS. 1 and 2, the columnar layer 50 is provided to extend from the outermost surface of the anode plate 10 toward the inside in the thickness direction. The columnar layer 50 may be in contact with the core portion 11 or does not need to be in contact with the core portion 11 in the thickness direction as shown in FIG. 2.

When the columnar layer 50 is in contact with the core portion 11 in the thickness direction, the region where the columnar layer 50 is present can be made larger as compared when the columnar layer 50 is not in contact with the core portion 11 in the thickness direction. Therefore, the occurrence of delamination can be suppressed by that extent.

When the columnar layer 50 is not in contact with the core portion 11 in the thickness direction, the insulating region where the columnar layer 50 is present can be made smaller as compared when the columnar layer 50 is in contact with the core portion 11 in the thickness direction. Therefore, the decrease in the capacitance of the solid electrolytic capacitor 1 can be suppressed by that extent.

When viewed from a cross-section along the thickness direction, the dimension of the columnar layer 50 in a direction perpendicular to the thickness direction may be smaller, larger, or constant from the outermost surface of the anode plate 10 toward the inside as shown in FIG. 2.

When viewed from a cross-section along the thickness direction, the dimension of a columnar layer 50 in a direction perpendicular to the thickness direction may be smaller at the end portion on the core portion 11 side than at the end portion on the opposite side to the core portion 11, as shown in FIG. 2, or may be larger at the end portion on the core portion 11 side than at the end portion on the opposite side to the core portion 11, or may be same at the end portion on the core portion 11 side and at the end portion on the opposite side to the core portion 11.

The columnar layer 50 may be provided outside the porous layer 12 and may or does not need to overlap the cathode layer 30 in the thickness direction.

The planar shape of the columnar layer 50 when viewed from the thickness direction is, for example, a circular shape, an elliptical shape, a polygonal shape, and the like.

From the viewpoint of suppressing the occurrence of delamination, the difference between the coefficient of linear expansion of the columnar layer 50 and the coefficient of linear expansion of the anode plate 10 is preferably 100 ppm/K or less and particularly preferably 20 ppm/K or less.

From the viewpoint of suppressing the occurrence of delamination, the elastic modulus of the columnar layer 50 is preferably 2 Gpa or less and particularly preferably 50 Mpa or less. In this case, the columnar layer 50 is less likely to be a starting point of thermal stress.

The columnar layer 50 is formed, for example, by applying the outermost surface of the anode plate 10 that does not overlap the formation region or the formation scheduled region of the mask layer 40 with an insulating material and permeating the insulating material from the outermost surface of the anode plate 10 toward the inside in the thickness direction to be surrounded by the formation region or the formation scheduled region of the cathode layer 30 at a distance from the formation region or the formation scheduled region of the mask layer 40 in the porous layer 12.

The columnar layer 50 may be formed at the same timing as the mask layer 40 or may be formed at a different timing from the mask layer 40 with respect to the porous layer 12. When the columnar layer 50 is formed at a different timing from the mask layer 40, the columnar layer 50 may be formed at a timing earlier than the mask layer 40 or may be formed at a timing later than the mask layer 40.

The columnar layer 50 may be formed at a timing before the dielectric layer 20 or may be formed at a timing after the dielectric layer 20 with respect to the porous layer 12.

The solid electrolytic capacitor 1 is manufactured, for example, by the following method.

First, the anode plate 10 having the porous layer 12 on both main surfaces of the core portion 11, that is, the anode plate 10 having the porous layer 12 on both main surfaces is prepared. Then, by performing an anodization treatment on the anode plate 10, an oxide film that becomes the dielectric layer 20 is formed on the surface of the porous layer 12.

Next, when the insulating material is applied to the outermost surface of the anode plate 10 and permeates from the outermost surface of the anode plate 10 toward the inside in the thickness direction, the mask layer 40 is formed to surround the formation scheduled region of the cathode layer 30, and further the columnar layer 50 is formed at a distance from the mask layer 40 in a region surrounded by the mask layer 40 in the porous layer 12.

In this case, from the viewpoint of efficiently manufacturing a plurality of solid electrolytic capacitors 1, the mask layer 40 and the columnar layer 50 are each formed in a plurality of regions, assuming that the cathode layer 30 is formed in the plurality of regions. In consideration of forming the cathode layer 30 in only one region, one mask layer 40 and one columnar layer 50 may be formed.

Then, the treatment of applying the dispersion liquid of the conductive polymer to the surface of the dielectric layer 20 and drying the dispersion liquid is repeated a plurality of times for each of the regions surrounded by the mask layer 40 and surrounding the columnar layer 50, whereby the first solid electrolyte layer 31A is formed inside the pores of the dielectric layer 20. Thereafter, the dispersion liquid of the conductive polymer is applied to the surface of the first solid electrolyte layer 31A and dried, whereby the second solid electrolyte layer 31B is formed to cover the first solid electrolyte layer 31A. In this manner, the solid electrolyte layer 31 including the first solid electrolyte layer 31A and the second solid electrolyte layer 31B is formed.

Subsequently, a conductive paste containing a conductive filler is applied to the surface of the second solid electrolyte layer 31B to form the first conductor layer 32A provided on the surface of the second solid electrolyte layer 31B. Thereafter, a metal paste containing a metal filler is applied to the surface of the first conductor layer 32A to form the second conductor layer 32B provided on the surface of the first conductor layer 32A. In this manner, the conductor layer 32 including the first conductor layer 32A and the second conductor layer 32B is formed.

As described above, a solid electrolytic capacitor sheet having a plurality of capacitor portions is manufactured.

Thereafter, the solid electrolytic capacitor sheet is cut and divided into pieces such that the capacitor portions are independent of each other and the mask layer 40 is positioned on the peripheral edge of the porous layer 12, thereby manufacturing the solid electrolytic capacitor 1.

Embodiment 2

Unlike the solid electrolytic capacitor of Embodiment 1 of the present disclosure, a solid electrolytic capacitor of Embodiment 2 of the present disclosure includes a cathode layer, a mask layer, and a columnar layer. When viewed from a cross-section along the thickness direction, a first solid electrolyte layer includes an outer side portion in contact with the mask layer and an inner side portion in contact with the columnar layer and not in contact with the outer side portion, on a surface of a dielectric layer on the outermost surface of an anode plate, and at least a part of a second solid electrolyte layer penetrates an inside of the pores of the dielectric layer in a region between the outer side portion and the inner side portion of the first solid electrolyte layer.

Figure 3:
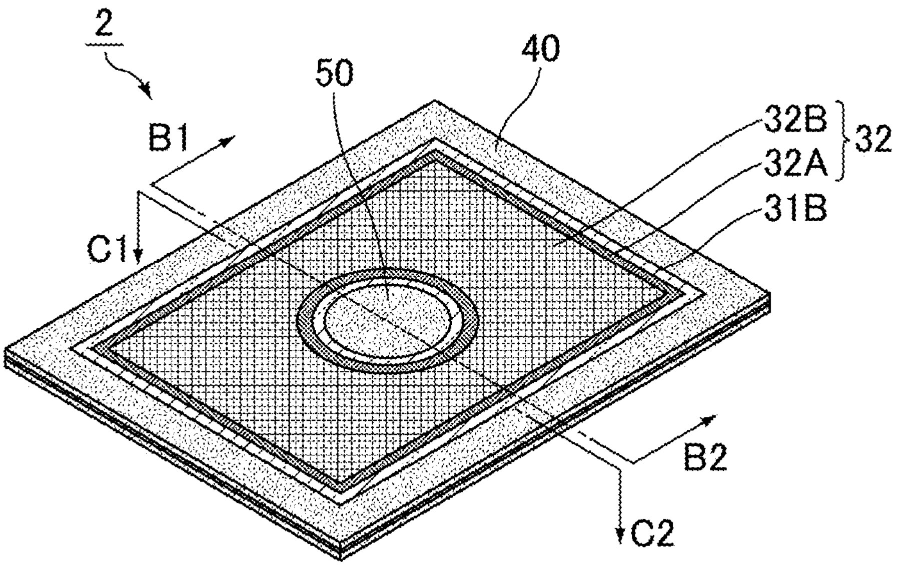
FIG. 3 is a schematic perspective view showing an example of a solid electrolytic capacitor of Embodiment 2 of the present disclosure.
Figure 4:
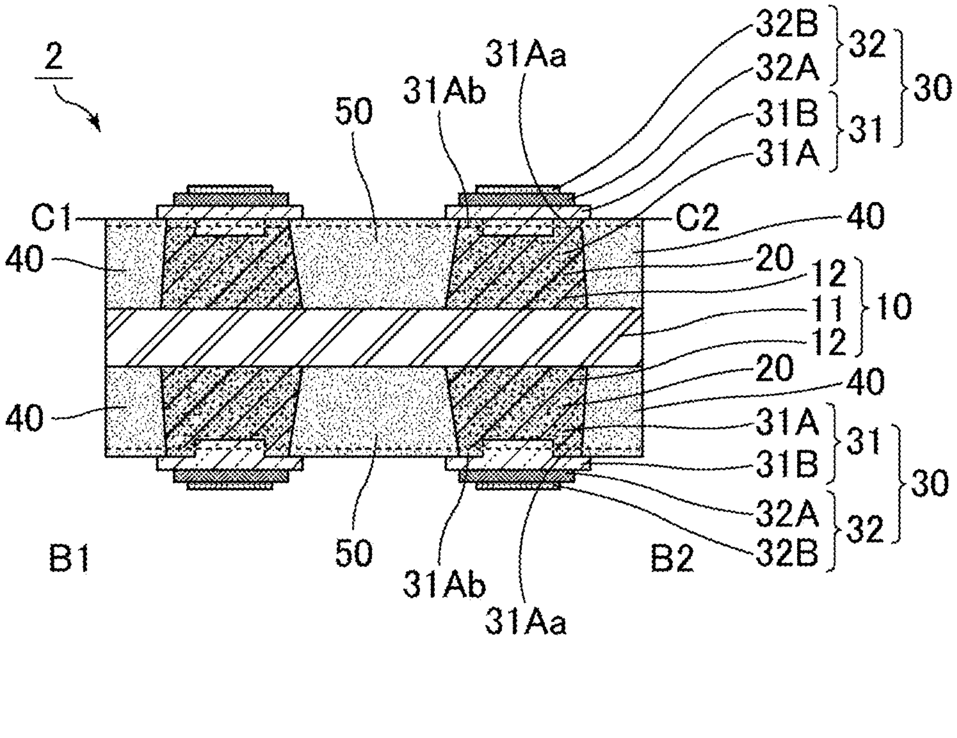
FIG. 4 is a schematic cross-sectional view showing an example of a cross section taken along a line segment B1-B2 of the solid electrolytic capacitor shown in FIG. 3.

FIG. 3 is a schematic perspective view showing an example of a solid electrolytic capacitor of Embodiment 2 of the present disclosure. FIG. 4 is a schematic cross-sectional view showing an example of a cross-section taken along the line segment B1-B2 of the solid electrolytic capacitor shown in FIG. 3.

The solid electrolytic capacitor 2 shown in FIG. 3 includes the cathode layer 30, the mask layer 40, and the columnar layer 50, and as shown in FIG. 4, when viewed from a cross-section along the thickness direction, the first solid electrolyte layer 31A includes an outer side portion 31Aa in contact with the mask layer 40 and an inner side portion 31Ab in contact with the columnar layer 50 and not in contact with the outer side portion 31Aa, on a surface of the dielectric layer 20 on the outermost surface of the anode plate 10 (on the surface roughly indicated by the dotted line in FIG. 4).

Figure 5:
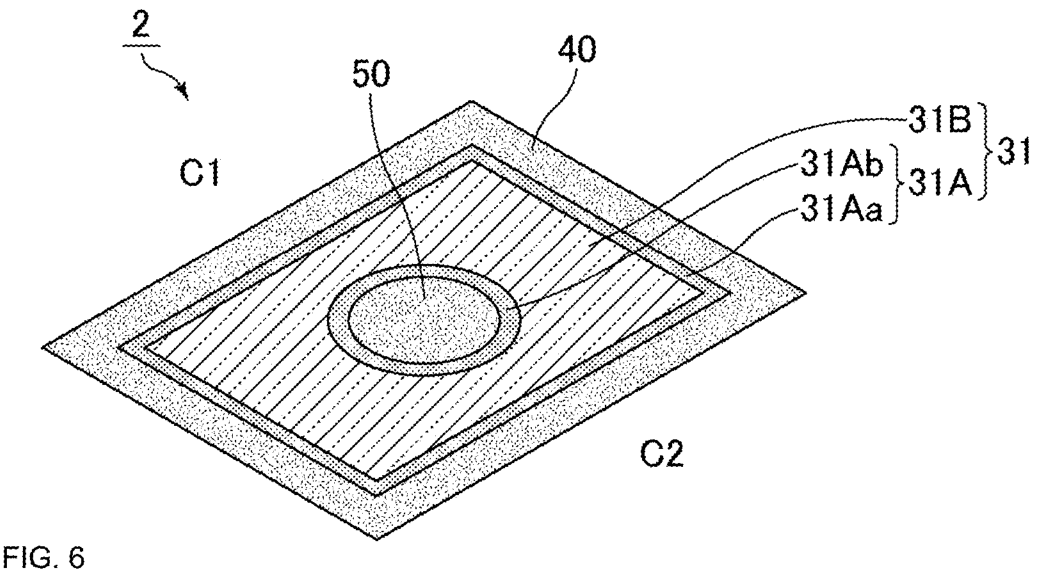
FIG. 5 is a schematic cross-sectional view showing an example of a cross section taken along a line segment C1-C2 of the solid electrolytic capacitor shown in FIG. 3.

FIG. 5 is a schematic cross-sectional view showing an example of a cross section taken along the line segment C1-C2 of the solid electrolytic capacitor shown in FIG. 3. The line segment C1-C2 in FIG. 3 corresponds to the line segment C1-C2 in FIG. 4.

The solid electrolytic capacitor 2 shown in FIG. 3 includes the cathode layer 30, the mask layer 40, and the columnar layer 50 on the surface of the dielectric layer 20 on the outermost surface of the anode plate 10, and as shown in FIG. 5, even when the cross section is taken along the direction perpendicular to the thickness direction on the surface of the dielectric layer 20 on the outermost surface of the anode plate 10, the first solid electrolyte layer 31A includes the outer side portion 31Aa in contact with the mask layer 40 and the inner side portion 31Ab in contact with the columnar layer 50 and not in contact with the outer side portion 31Aa.

As described above, in the vicinity of the columnar layer 50, delamination between the porous layer 12 and the solid electrolyte layer 31 is less likely to occur. In the solid electrolytic capacitor 2, the first solid electrolyte layer 31A having the inner side portion 31Ab in contact with the columnar layer 50 is provided in the vicinity of the columnar layer 50 where delamination is less likely to occur, whereby the excellent conductivity of the first solid electrolyte layer 31A is likely to be exhibited. Therefore, in the solid electrolytic capacitor 2, the equivalent series resistance (ESR) is likely to decrease, and the capacitance is less likely to decrease.

As shown in FIG. 5, the outer side portion 31Aa of the first solid electrolyte layer 31A is preferably provided along the entirety of the inner edge of the mask layer 40. The outer side portion 31Aa of the first solid electrolyte layer 31A may be provided along a part of the inner edge of the mask layer 40.

As shown in FIG. 5, the inner side portion 31Ab of the first solid electrolyte layer 31A is preferably provided along the entirety of the outer edge of the columnar layer 50. The inner side portion 31Ab of the first solid electrolyte layer 31A may be provided along a part of the outer edge of the columnar layer 50.

The first solid electrolyte layer 31A has a configuration in which the outer side portion 31Aa and the inner side portion 31Ab at a distance from each other on the surface of the dielectric layer 20 on the outermost surface of the anode plate 10. On the other hand, the first solid electrolyte layer 31A has a configuration in which a portion extending from the outer side portion 31Aa and the inner side portion 31Ab toward the inside of the anode plate 10 is connected to the inside of the anode plate 10.

As shown in FIG. 4, at least a part of the second solid electrolyte layer 31B penetrates the inside of the pores of the dielectric layer 20 in a region between the outer side portion 31Aa of the first solid electrolyte layer 31A and the inner side portion 31Ab of the first solid electrolyte layer 31A. When at least a part of the second solid electrolyte layer 31B penetrates the inside of the pores of the dielectric layer 20, the contact area between the second solid electrolyte layer 31B and the dielectric layer 20 increases, and furthermore the occurrence of delamination between the porous layer 12 and the solid electrolyte layer 31 is likely to be suppressed by the anchor effect of the second solid electrolyte layer 31B.

The solid electrolytic capacitor 2 is manufactured, for example, by the following method.

First, the dielectric layer 20 is formed on the anode plate 10 having the porous layer 12 on both main surfaces in the same manner as in the above-described manufacturing method for the solid electrolytic capacitor 1, and the mask layer 40 and the columnar layer 50 are further formed.

Then, the treatment of applying the dispersion liquid of the conductive polymer to the surface of the dielectric layer 20 in each of the regions surrounded by the mask layer 40 and surrounding the columnar layer 50 and drying the dispersion liquid is repeated a plurality of times to form the first solid electrolyte layer 31A. When forming the first solid electrolyte layer 31A, on the surface of the dielectric layer 20 on the outermost surface of the anode plate 10, a surface layer film is formed to extend to the outside of the pores of the dielectric layer 20 while filling the inside of the pores of the dielectric layer 20 in the vicinity of the mask layer 40 and the columnar layer 50. At this time, the amount of applying the dispersion liquid of the conductive polymer is adjusted so that the above-described surface layer film is not formed on the entire outermost surface of the anode plate 10, that is, is not formed in a region other than the vicinity of the mask layer 40 and the columnar layer 50. As described above, the first solid electrolyte layer 31A is formed on the surface of the dielectric layer 20 on the outermost surface of the anode plate 10 to include the outer side portion 31Aa in contact with the mask layer 40 and the inner side portion 31Ab in contact with the columnar layer 50 and not in contact with the outer side portion 31Aa.

Thereafter, the dispersion liquid of the conductive polymer is applied to the surface of the first solid electrolyte layer 31A and dried to form the second solid electrolyte layer 31B so that at least a part of the second solid electrolyte layer 31B penetrates the inside the pores of the dielectric layer 20 in a region between the outer side portion 31Aa and the inner side portion 31Ab of the first solid electrolyte layer 31A.

Subsequently, a solid electrolytic capacitor sheet is manufactured by forming the conductor layer 32 including the first conductor layer 32A and the second conductor layer 32B in the same manner as in the above-described manufacturing method for the solid electrolytic capacitor 1.

Thereafter, the solid electrolytic capacitor sheet is cut and divided into pieces such that the capacitor portions are independent of each other and the mask layer 40 is positioned on the peripheral edge of the porous layer 12, thereby manufacturing the solid electrolytic capacitor 2.

Embodiment 3

A solid electrolytic capacitor of Embodiment 3 of the present disclosure is different from the solid electrolytic capacitor of Embodiment 2 of the present disclosure in that the solid electrolytic capacitor further includes a resin material and an insulating portion that covers a conductor layer.

Figure 6:
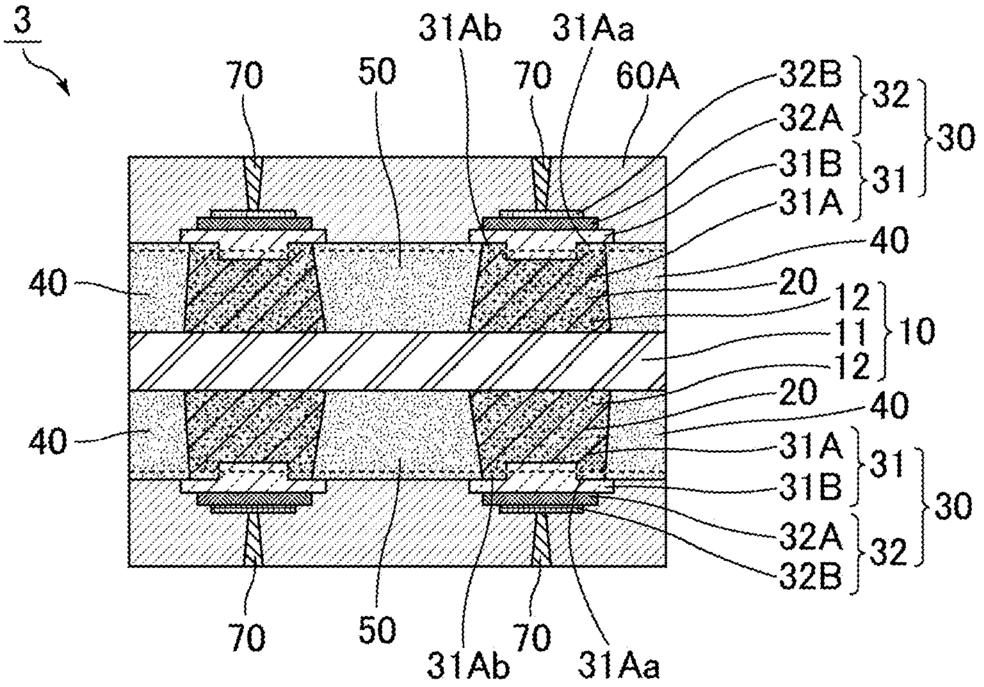
FIG. 6 is a schematic cross-sectional view showing an example of a solid electrolytic capacitor of Embodiment 3 of the present disclosure.

FIG. 6 is a schematic cross-sectional view showing an example of the solid electrolytic capacitor of Embodiment 3 of the present disclosure.

In addition to the configurations of the solid electrolytic capacitors 2 shown in FIGS. 3, 4, and 5, a solid electrolytic capacitor 3 shown in FIG. 6 further includes an insulating portion 60A and a via conductor 70.

The insulating portion 60A contains a resin material.

Examples of the resin material contained in the insulating portion 60A include epoxy, phenol, and polyimide.

The insulating portion 60A may further include an inorganic filler such as silica or alumina in addition to the resin material.

The insulating portion 60A covers the conductor layer 32. In the example shown in FIG. 6, the insulating portion 60A further covers the mask layer 40 and the columnar layer 50 in addition to the conductor layer 32.

In the solid electrolytic capacitor 3, the insulating portion 60A that covers the conductor layer 32 is provided, and thus deformation due to an external force is suppressed, and accordingly, the occurrence of delamination is also suppressed.

In the example shown in FIG. 6, the insulating portion 60A is provided so that a part of the anode plate 10, in particular, an end surface of the core portion 11 is exposed from the insulating portion 60A. Accordingly, even when the insulating portion 60A is provided, the anode plate 10 can be connected to the outside of the insulating portion 60A.

The insulating portion 60A is formed in a predetermined region by, for example, a method of attaching a resin sheet to cover the conductor layer 32, a method of coating the conductor layer 32 with a resin paste, or the like.

The via conductor 70 is provided to reach the cathode layer 30 from the surface of the insulating portion 60A in the thickness direction, more specifically, to reach the second conductor layer 32B from the surface of the insulating portion 60A. Accordingly, the cathode layer 30 is electrically led to the outside of the insulating portion 60A through the via conductor 70 and can be electrically connected to the outside of the insulating portion 60A.

Examples of a constituent material of the via conductor 70 include a low-resistance metal such as silver, gold, or copper.

The via conductor 70 is formed, for example, as follows. First, by performing drilling, laser processing, or the like on the insulating portion 60A, holes are provided that reach from the surface of the insulating portion 60A to the cathode layer 30, here, from the surface of the insulating portion 60A to the second conductor layer 32B in the thickness direction. Then, the via conductor 70 is formed by plating the inner wall surface of the holes provided in the insulating portion 60A, filling the holes with a conductive paste, and then performing a heat treatment.

The solid electrolytic capacitor 3 is manufactured, for example, by the following method.

First, a solid electrolytic capacitor sheet is manufactured in the same manner as in the above-described manufacturing method for the solid electrolytic capacitor 2.

Next, by attaching a resin sheet to both main surfaces of the solid electrolytic capacitor sheet, the insulating portion 60A covering the conductor layer 32 is formed. In this manner, a solid electrolytic capacitor array sheet is manufactured.

Then, the solid electrolytic capacitor array sheet is cut such that the capacitor portions are independent of each other and the mask layer 40 is positioned on the peripheral edge of the porous layer 12. Thereafter, the resin sheet is pressure-bonded to fill the groove provided by cutting. The resin sheet that is pressure-bonded to fill the groove provided by cutting corresponds to an insulating portion 60B described later.

Subsequently, by performing drilling, laser processing, or the like on the insulating portion 60A, holes are provided that reach the second conductor layer 32B from the surface of the insulating portion 60A in the thickness direction. Then, the conductive paste is filled in the holes provided in the insulating portion 60A, and the heat treatment is performed to form the via conductor 70.

The via conductor 70 may be formed after the step of cutting the solid electrolytic capacitor array sheet and burying the groove, or may be formed before the step of cutting the solid electrolytic capacitor array sheet and burying the groove.

Thereafter, the solid electrolytic capacitor array sheet is cut and divided into pieces such that the capacitor portions are independent of each other, thereby manufacturing the solid electrolytic capacitor 3.

Embodiment 4

A solid electrolytic capacitor of Embodiment 4 of the present disclosure is different from the solid electrolytic capacitor of Embodiment 1 of the present disclosure in that the solid electrolytic capacitor further includes a through-hole conductor that penetrates the columnar layer in the thickness direction. In the solid electrolytic capacitor of Embodiment 4 of the present disclosure, it is preferable that the through-hole conductor is provided on at least an inner wall surface of the through-hole penetrating the columnar layer in the thickness direction and is electrically connected to the anode plate on the inner wall surface of the through-hole.

Figure 7:
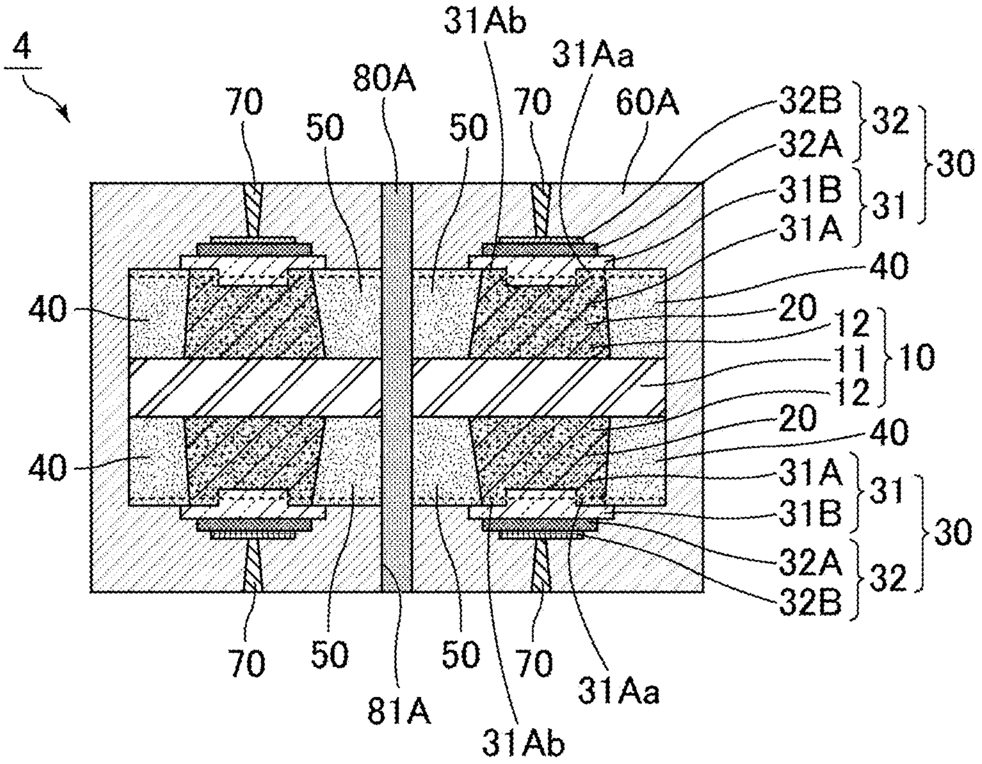
FIG. 7 is a schematic cross-sectional view showing an example of a solid electrolytic capacitor of Embodiment 4 of the present disclosure.

FIG. 7 is a schematic cross-sectional view showing an example of a solid electrolytic capacitor of Embodiment 4 of the present disclosure.

A solid electrolytic capacitor 4 shown in FIG. 7 further includes a through-hole conductor 80A in addition to the configuration of the solid electrolytic capacitor 3 shown in FIG. 6.

The through-hole conductor 80A penetrates the columnar layer 50 in the thickness direction. In the example shown in FIG. 7, the through-hole conductor 80A penetrates the anode plate 10 (core portion 11) and the insulating portion 60A in the thickness direction in addition to the columnar layer 50.

In the solid electrolytic capacitor 4, the through-hole conductor 80A penetrating the columnar layer 50 in the thickness direction is provided so that an electrical function is imparted to the columnar layer 50.

The through-hole conductor 80A is preferably provided on at least an inner wall surface of the through-hole 81A penetrating the columnar layer 50 in the thickness direction. In the example shown in FIG. 7, the through-hole conductor 80A is provided in the entire inside of the through-hole 81A that penetrates the columnar layer 50 and the anode plate 10 (core portion 11) in the thickness direction.

It is preferable that the through-hole conductor 80A is electrically connected to the anode plate 10 on the inner wall surface of the through-hole 81A. More specifically, it is preferable that the through-hole conductor 80A is electrically connected to an end surface of the anode plate 10 facing the inner wall surface of the through-hole 81A in a direction perpendicular to the thickness direction. In the example shown in FIG. 7, the through-hole conductor 80A is connected to an end surface of the anode plate 10, particularly, an end surface of the core portion 11. As a result, the anode plate 10 is electrically led to the outside through the through-hole conductor 80A. That is, the columnar layer 50 is provided with an electrical function of electrically leading the anode plate 10 to the outside.

It is preferable that the through-hole conductor 80A is electrically connected to the anode plate 10 over the entire circumference of the through-hole 81A as viewed from the thickness direction. As a result, since the connection resistance between the through-hole conductor 80A and the anode plate 10 is likely to decrease, the equivalent series resistance of the solid electrolytic capacitor 4 is likely to decrease.

The through-hole conductor 80A is formed, for example, as follows. First, by performing drilling, laser processing, or the like, the through-holes 81A are provided that penetrate the insulating portion 60A, the columnar layer 50, and the anode plate 10 (core portion 11) in the thickness direction. Then, the inner wall surface of the through-hole 81A is metallized with a low-resistance metal such as copper, gold, or silver to form the through-hole conductor 80A. When forming the through-hole conductor 80A, for example, the inner wall surface of the through-hole 81A is metallized by an electroless copper plating treatment or an electrolytic copper plating treatment to facilitate the processing. In addition, a method of forming the through-hole conductor

80A may be a method of filling the through-hole 81A with a metal, a composite material of a metal and a resin, or the like, in addition to the method of metallizing the inner wall surface of the through-hole 81A.

The solid electrolytic capacitor 4 is manufactured, for example, by the following method.

First, a solid electrolytic capacitor array sheet is manufactured in the same manner as in the above-mentioned manufacturing method for the solid electrolytic capacitor 3.

Next, the solid electrolytic capacitor array sheet is cut such that the capacitor portions are independent of each other and the mask layer 40 is positioned on the peripheral edge of the porous layer 12. Thereafter, the resin sheet is pressure-bonded to fill the groove provided by cutting. The resin sheet that is pressure-bonded to fill the groove provided by cutting corresponds to the insulating portion 60B described later.

Then, the insulating portion 60A, the columnar layer 50, and the anode plate 10 (core portion 11) are provided with the through-hole 81A penetrating in the thickness direction by performing drilling, laser processing, or the like on the solid electrolytic capacitor array sheet. Then, the inner wall surface of the through-hole 81A is metallized with a low-resistance metal such as copper, gold, or silver to form the through-hole conductor 80A.

The through-hole conductor 80A may be formed after the step of cutting the solid electrolytic capacitor array sheet and burying the groove, or may be formed before the step of cutting the solid electrolytic capacitor array sheet and burying the groove.

Subsequently, by performing drilling, laser processing, or the like on the insulating portion 60A, holes are provided that reach the second conductor layer 32B from the surface of the insulating portion 60A in the thickness direction. Then, the conductive paste is filled in the hole provided in the insulating portion 60A, and a heat treatment is performed to form the via conductor 70.

The via conductor 70 may be formed after the step of cutting the solid electrolytic capacitor array sheet and burying the groove, or may be formed before the step of cutting the solid electrolytic capacitor array sheet and burying the groove.

The via conductor 70 may be formed after the step of forming the through-hole conductor 80A or may be formed before the step of forming the through-hole conductor 80A.

Thereafter, the solid electrolytic capacitor array sheet is cut and divided into pieces such that the capacitor portions are independent of each other, thereby manufacturing the solid electrolytic capacitor 4.

Embodiment 5

A capacitor array of the present disclosure includes a plurality of the solid electrolytic capacitors of the present disclosure.

Hereinafter, an example of the capacitor array of the present disclosure will be described as a capacitor array of Embodiment 5 of the present disclosure having a plurality of solid electrolytic capacitors of Embodiment 3 of the present disclosure.

Figure 8:
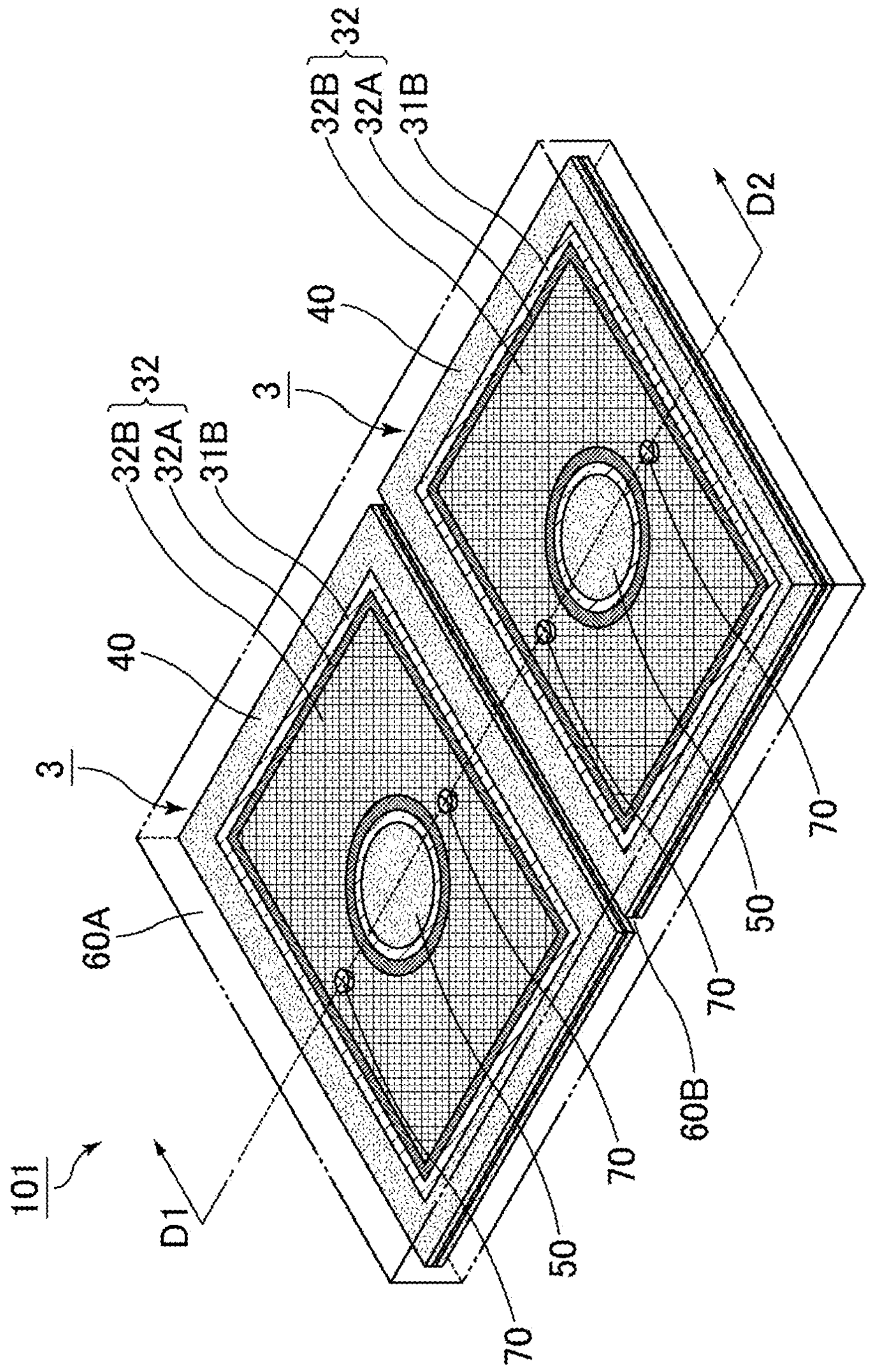
FIG. 8 is a schematic perspective view showing an example of a capacitor array of Embodiment 5 of the present disclosure.
Figure 9:
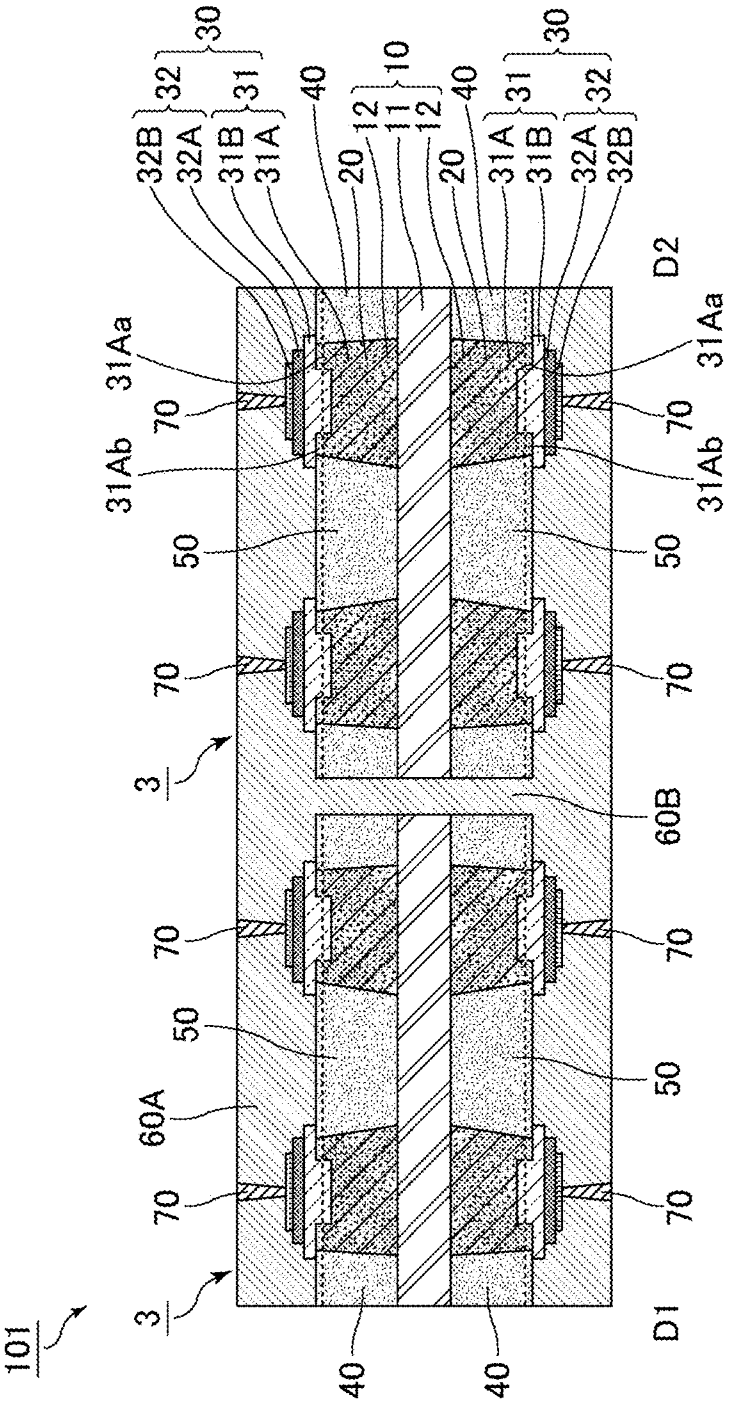
FIG. 9 is a schematic cross-sectional view showing an example of a cross section taken along a line segment D1-D2 of the capacitor array shown in FIG. 8.

FIG. 8 is a schematic perspective view showing an example of the capacitor array of Embodiment 5 of the present disclosure. FIG. 9 is a schematic cross-sectional view showing an example of a cross section taken along the line segments D1-D2 of the capacitor array shown in FIG. 8.

A capacitor array 101 shown in FIGS. 8 and 9 includes a plurality of the solid electrolytic capacitors 3 shown in FIG. 6. In the examples shown in FIGS. 8 and 9, the capacitor array 101 has two solid electrolytic capacitors 3.

As described above, the delamination between the porous layer and the solid electrolyte layer is particularly likely to occur when the area of the solid electrolytic capacitor is large as viewed from the thickness direction. This tendency is the same even in a capacitor array in which the solid electrolytic capacitors are arranged in an array, and in a capacitor array, which tends to have a large area as viewed in the thickness direction, delamination is also likely to occur between the porous layer and the solid electrolyte layer.

On the other hand, in the capacitor array 101 in which the plurality of solid electrolytic capacitors 3 are arranged in an array, delamination between the layers of a plurality of different materials, particularly, delamination between the porous layer 12 and the solid electrolyte layer 31 is less likely to occur while the deformation due to the external force is suppressed.

In addition, by disposing the plurality of solid electrolytic capacitors 3 in an array to form the capacitor array 101, it is possible to provide a capacitor array having a multi-channel configuration in which the capacitance and the position are optimized for a market demand.

Further, by using the capacitor array 101 in which the plurality of solid electrolytic capacitors 3 are arranged in an array, the plurality of solid electrolytic capacitors 3 can be efficiently mounted on a substrate.

The plurality of solid electrolytic capacitors 3 may be disposed in a planar shape or may be disposed in a linear shape.

The plurality of solid electrolytic capacitors 3 may be regularly disposed or irregularly disposed.

The areas of the plurality of solid electrolytic capacitors 3 as viewed from the thickness direction may be the same as or different from each other, or may be partially different from each other.

The planar shapes of the plurality of solid electrolytic capacitors 3 as viewed from the thickness direction may be the same as or different from each other, or may be partially different from each other.

It is preferable that the capacitor array 101 further includes the insulating portion 60B that fills a space between the plurality of solid electrolytic capacitors 3, here, between the two solid electrolytic capacitors 3.

The insulating portion 60B preferably includes a resin material.

Examples of the resin material contained in the insulating portion 60B include epoxy, phenol, and polyimide.

The insulating portion 60B may further include an inorganic filler such as silica or alumina in addition to the resin material.

The resin material included in the insulating portion 60B may be the same as the resin material included in the insulating portion 60A, or may be different from the resin material included in the insulating portion 60A.

The constituent material of the insulating portion 60B may be the same as or different from the constituent material of the insulating portion 60A.

When the constituent material of the insulating portion 60B is the same as the constituent material of the insulating portion 60A, as shown in FIGS. 8 and 9, the insulating portion 60A and the insulating portion 60B are integrated, and the interface between the insulating portion 60A and the insulating portion 60B is not clear in many cases. The interface between the insulating portion 60A and the insulating portion 60B may be clearly visible.

The insulating portion 60B may be a portion configured by the insulating portion 60A extending between the plurality of solid electrolytic capacitors 3, here, between the two solid electrolytic capacitors 3. That is, the insulating portion 60B may be included in the insulating portion 60A.

The insulating portion 60B is formed by, for example, filling between the plurality of solid electrolytic capacitors 3, here, between the two solid electrolytic capacitors 3, by a method of pressure-bonding a resin sheet, a method of applying a resin paste, or the like.

The capacitor array 101 is manufactured, for example, in the manufacturing process of the solid electrolytic capacitor 3 described above, by cutting and dividing the solid electrolytic capacitor array sheet into pieces to include a desired number of capacitor portions, here, two capacitor portions.

Embodiment 6

A capacitor array of Embodiment 6 of the present disclosure has a plurality of solid electrolytic capacitors including the solid electrolytic capacitor of Embodiment 4 of the present disclosure, unlike the capacitor array of Embodiment 5 of the present disclosure.

Figure 10:
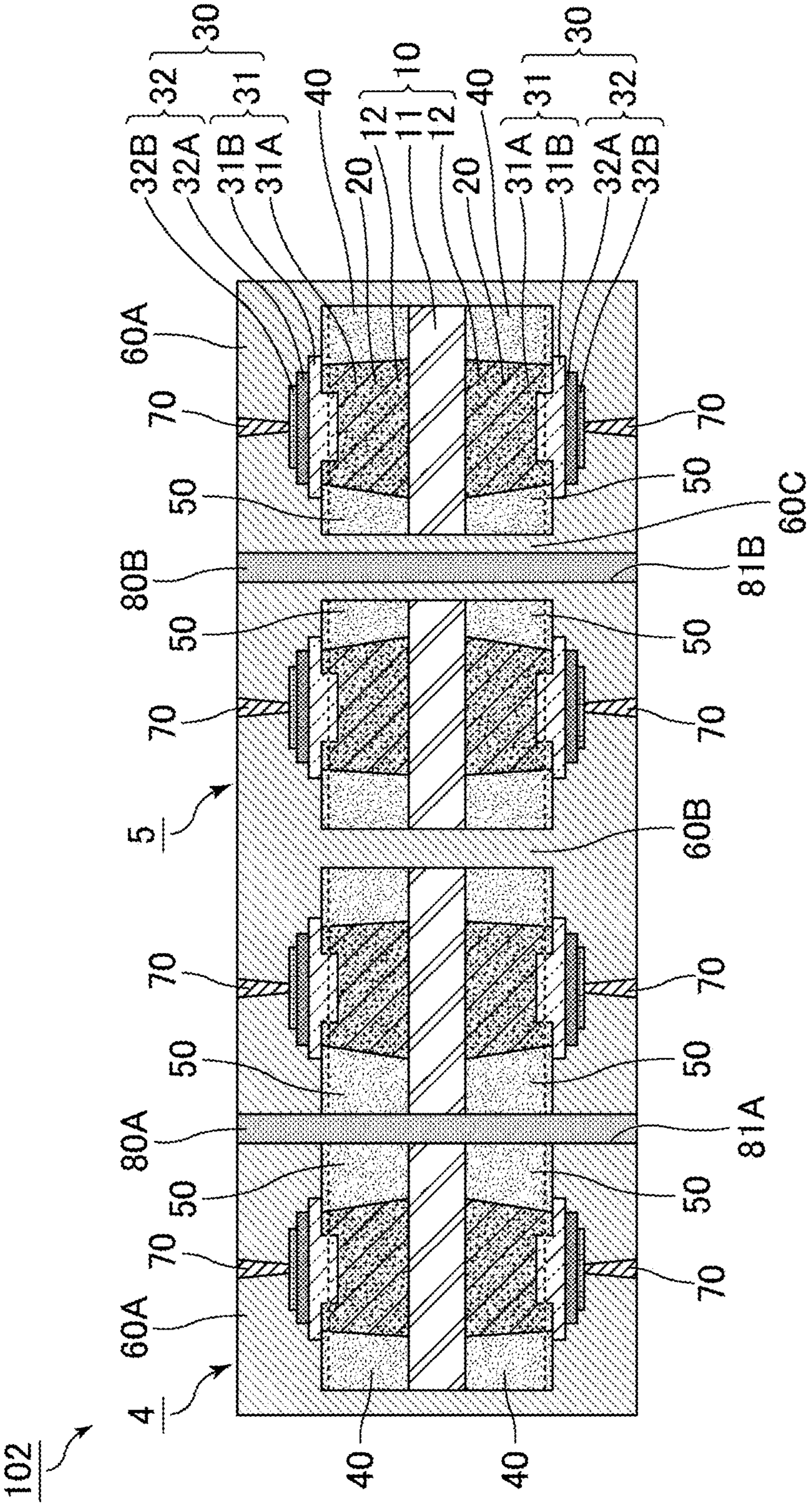
FIG. 10 is a schematic cross-sectional view showing an example of a capacitor array of Embodiment 6 of the present disclosure.

FIG. 10 is a schematic cross-sectional view showing an example of a capacitor array of Embodiment 6 of the present disclosure.

A capacitor array 102 shown in FIG. 10 includes the solid electrolytic capacitor 4 shown in FIG. 7.

The capacitor array 102 further includes a solid electrolytic capacitor 5 in addition to the solid electrolytic capacitor 4.

The capacitor array 102 may have a plurality of sets consisting of the solid electrolytic capacitor 4 and the solid electrolytic capacitor 5.

The solid electrolytic capacitor 5 further includes an insulating portion 60C and a through-hole conductor 80B in addition to the configuration of the solid electrolytic capacitor 3 shown in FIG. 6.

The insulating portion 60C penetrates the columnar layer 50 in the thickness direction. In the example shown in FIG. 10, the insulating portion 60C penetrates the anode plate 10 (core portion 11) in the thickness direction in addition to the columnar layer 50.

The insulating portion 60C preferably includes a resin material.

Examples of the resin material contained in the insulating portion 60C include epoxy, phenol, and polyimide.

The insulating portion 60C may further contain an inorganic filler such as silica or alumina in addition to the resin material.

The resin material contained in the insulating portion 60C may be the same as or different from the resin material contained in the insulating portion 60A.

The constituent material of the insulating portion 60C may be the same as or different from the constituent material of the insulating portion 60A.

When the constituent material of the insulating portion 60C is the same as the constituent material of the insulating portion 60A, as shown in FIG. 10, the insulating portion 60A and the insulating portion 60C are integrated, and the interface between the insulating portion 60A and the insulating portion 60C is not clear in many cases. The interface between the insulating portion 60A and the insulating portion 60C may be clearly visible.

The insulating portion 60C may be a portion configured such that the insulating portion 60A extends to penetrate the columnar layer 50. That is, the insulating portion 60C may be included in the insulating portion 60A.

The resin material contained in the insulating portion 60C may be the same as the resin material contained in the insulating portion 60B, or may be different from the resin material contained in the insulating portion 60B.

The constituent material of the insulating portion 60C may be the same as or different from the constituent material of the insulating portion 60B.

The insulating portion 60C is formed, for example, as follows. First, by performing drilling, laser processing, or the like, through-holes are provided that penetrate the insulating portion 60A, the columnar layer 50, and the anode plate 10 (core portion 11) in the thickness direction. Then, the through-holes are filled with a method of pressure-bonding the resin sheet, a method of applying a resin paste, or the like to form the insulating portion 60C.

The through-hole conductor 80B penetrates the insulating portion 60C in the thickness direction. In the example shown in FIG. 10, the through-hole conductor 80B is provided in a region surrounded by the insulating portion 60C present on the inner wall surface of the through-hole that penetrates the insulating portion 60A, the columnar layer 50, and the anode plate 10 (core portion 11) in the thickness direction.

It is preferable that the through-hole conductor 80B is provided on at least an inner wall surface of the through-hole 81B that penetrates the insulating portion 60C in the thickness direction. In the example shown in FIG. 10, the through-hole conductor 80B is provided in the entire inside of the through-hole 81B that penetrates the insulating portion 60C in the thickness direction.

It is preferable that the through-hole conductor 80B is electrically connected to the cathode layer 30. For example, when a conductive portion (not shown) is provided to extend over the surface of the via conductor 70 and the surface of the through-hole conductor 80B, the through-hole conductor 80B is electrically connected to the cathode layer 30 through the conductive portion and the via conductor 70. In this case, it is possible to reduce the size of the capacitor array 102.

The through-hole conductor 80B is formed, for example, as follows. First, by performing drilling, laser processing, or the like, through-holes are provided that penetrate the insulating portion 60A, the columnar layer 50, and the anode plate 10 (core portion 11) in the thickness direction. Next, the through-holes are filled with a method of pressure-bonding the resin sheet, a method of applying a resin paste, or the like to form the insulating portion 60C. Then, the through-hole 81B that penetrates the insulating portion 60C in the thickness direction is formed by performing a drilling process, a laser process, or the like on the insulating portion 60C. At this time, by making the diameter of the through-hole 81B smaller than the diameter of the insulating portion 60C, the insulating portion 60C is present between the through-hole formed in advance and the through-hole 81B. Thereafter, the inner wall surface of the through-hole 81B is metallized with a low-resistance metal such as copper, gold, or silver to form the through-hole conductor 80B. When forming the through-hole conductor 80B, for example, the inner wall surface of the through-hole 81B is metallized by an electroless copper plating treatment or an electrolytic copper plating treatment to facilitate the processing. In addition, a method of forming the through-hole conductor 80B may be a method of filling the through-hole 81B with a metal, a composite material of a metal and a resin, or the like, in addition to the method of metallizing the inner wall surface of the through-hole 81B.

The capacitor array 102 is manufactured, for example, by the following method.

First, a solid electrolytic capacitor array sheet is manufactured in the same manner as in the above-mentioned manufacturing method for the solid electrolytic capacitor 4.

Next, the solid electrolytic capacitor array sheet is cut such that the capacitor portions are independent of each other and the mask layer 40 is positioned on the peripheral edge of the porous layer 12. On the other hand, by performing drilling, laser processing, or the like, a part of the columnar layer 50 is provided with respect to the through-hole that penetrates the insulating portion 60A, the columnar layer 50, and the anode plate 10 (core portion 11) in the thickness direction.

The step of cutting the solid electrolytic capacitor array sheet and the step of providing a through-hole may be performed at the same timing or at different timings. When these steps are performed at different timings, the step of cutting the solid electrolytic capacitor array sheet may be performed before the step of providing the through-hole or after the step of providing the through-hole.

Thereafter, the resin sheet is pressure-bonded to fill the groove and the through-hole provided by cutting. Accordingly, the insulating portion 60B that fills the groove provided by cutting is formed, and the insulating portion 60C that fills the through-hole is formed.

Then, the through-hole 81A is provided that penetrates the insulating portion 60A, the columnar layer 50, and the anode plate 10 (core portion 11) in the thickness direction by performing drilling, laser processing, or the like on the columnar layer 50 in which the above-mentioned through-holes are not provided. On the other hand, the insulating portion 60C penetrates in the thickness direction by performing drilling, laser processing, or the like on the columnar layer 50 provided with the above-mentioned through-holes, and the through-holes 81B having a diameter smaller than that of the above-mentioned through-holes are provided.

The step of providing the through-hole 81A and the step of providing the through-hole 81B may be performed at the same timing or at different timings. When these steps are performed at different timings, the step of providing the through-hole 81A may be performed before the step of providing the through-hole 81B or may be performed after the step of providing the through-hole 81B.

Then, the inner wall surface of the through-hole 81A is metallized with a low-resistance metal such as copper, gold, or silver to form the through-hole conductor 80A. On the other hand, the inner wall surface of the through-hole 81B is metallized with a low-resistance metal such as copper, gold, or silver to form the through-hole conductor 80B.

Subsequently, by performing drilling, laser processing, or the like on the insulating portion 60A, holes are provided that reach the second conductor layer 32B from the surface of the insulating portion 60A in the thickness direction. Then, the conductive paste is filled in the hole provided in the insulating portion 60A, and a heat treatment is performed to form the via conductor 70.

Thereafter, the solid electrolytic capacitor array sheet provided with the insulating portion 60A, the insulating portion 60B, the insulating portion 60C, the via conductor 70, the through-hole conductor 80A, and the through-hole conductor 80B is cut and divided into pieces such that a desired number of capacitor portions, that is, two capacitor portions are included, thereby manufacturing the capacitor array 102.

The capacitor array of the present disclosure may have a plurality of solid electrolytic capacitors of Embodiment 1 of the present disclosure or may have a plurality of solid electrolytic capacitors of Embodiment 2 of the present disclosure, in addition to the above-described Embodiments 5 and 6.

The solid electrolytic capacitor of the present disclosure is used, for example, in a composite electronic component. Such a composite electronic component includes, for example, the solid electrolytic capacitor of the present disclosure, an outer electrode that is provided outside the solid electrolytic capacitor of the present disclosure and is electrically connected to each of the anode plate and the cathode layer, and an electronic component that is electrically connected to the outer electrode.

In the composite electronic component, the electronic component electrically connected to the outer electrode may be a passive element, an active element, both a passive element and an active element, or a combination of a passive element and an active element.

Examples of the passive element include an inductor or the like.

Examples of the active element include a memory, a graphical processing unit (GPU), a central processing unit (CPU), a micro processing unit (MPU), and a power management IC (PMIC).

When the solid electrolytic capacitor of the present disclosure is used for a composite electronic component, the solid electrolytic capacitor of the present disclosure is treated as a substrate for mounting electronic components, for example, as described above. Therefore, by forming the solid electrolytic capacitor of the present disclosure into a sheet-like shape as a whole and further forming the electronic component mounted on the solid electrolytic capacitor of the present disclosure into a sheet-like shape, the solid electrolytic capacitor of the present disclosure and the electronic component can be electrically connected in the thickness direction via a through-hole conductor that penetrates the electronic component in the thickness direction. As a result, it is possible to configure the passive element and the active element as electronic components in a single module.

For example, a switching regulator can be formed by electrically connecting the solid electrolytic capacitor of the present disclosure between a voltage regulator including a semiconductor active element and a load to which a converted direct-current voltage is supplied.

In a composite electronic component, a circuit layer may be formed on one main surface of a solid electrolytic capacitor sheet on which a plurality of solid electrolytic capacitors of the present disclosure are laid out, and the circuit layer may then be electrically connected to a passive element or an active element as an electronic component.

In addition, the solid electrolytic capacitor of the present disclosure may be disposed in a cavity portion provided in advance in a substrate, and after being embedded in a resin, a circuit layer may be formed on the resin. A passive element or an active element as another electronic component may be mounted in another cavity portion of the same substrate.

Alternatively, the solid electrolytic capacitor of the present disclosure may be mounted on a smooth carrier such as a wafer or glass, an outer layer portion is formed of a resin, a circuit layer is formed, and then the circuit layer may be electrically connected to a passive element or an active element as an electronic component.

REFERENCE SIGNS LIST

- 1, 2, 3, 4, 5 solid electrolytic capacitor
- 10 anode plate
- 11 core portion
- 12 porous layer
- 20 dielectric layer
- 30 cathode layer
- 31 solid electrolyte layer
- 31A first solid electrolyte layer
- 31Aa outer side portion of first solid electrolyte layer
- 31Ab inner side portion of first solid electrolyte layer
- 31B second solid electrolyte layer
- 32 conductor layer
- 32A first conductor layer
- 32B second conductor layer
- 40 mask layer
- 50 columnar layer
- 60A, 60B, 60C insulating portion
- 70 via conductor
- 80A, 80B through-hole conductor
- 81A, 81B through-hole
- 101, 102 capacitor array

The invention claimed is:

1. A solid electrolytic capacitor comprising:

an anode plate having a porous layer on at least one main surface thereof;

a dielectric layer on a surface of the porous layer;

a cathode layer on a surface of the dielectric layer, wherein the cathode layer includes a solid electrolyte layer on the surface of the dielectric layer, and a conductor layer on a surface of the solid electrolyte layer, and the solid electrolyte layer includes a first solid electrolyte layer in a region including an inside of pores of the dielectric layer, and a second solid electrolyte layer covering the first solid electrolyte layer;

a mask layer made of a first insulating material and located in a region surrounding the cathode layer at a peripheral edge of the porous layer; and a columnar layer made of a second insulating material and located at a distance from the mask layer in a region surrounded by the cathode layer in the porous layer, wherein, when viewed from a cross section along a thickness direction across the cathode layer, the mask layer, and the columnar layer, the first solid electrolyte layer includes an outer side portion in contact with the mask layer and an inner side portion in contact with the columnar layer and not in contact with the outer side portion, on the surface of the dielectric layer on an outermost surface of the anode plate, and at least a part of the second solid electrolyte layer penetrates the inside of the pores of the dielectric layer in a region between the outer side portion and the inner side portion of the first solid electrolyte layer.

2. The solid electrolytic capacitor according to claim 1, further comprising:

an insulating portion that contains a resin material and covers the conductor layer.

3. The solid electrolytic capacitor according to claim 2, further comprising:

a through-hole conductor that penetrates the columnar layer in a thickness direction.

4. The solid electrolytic capacitor according to claim 3, wherein the through-hole conductor is on at least an inner wall surface of a through-hole that penetrates the columnar layer in the thickness direction, and is electrically connected to the anode plate on the inner wall surface of the through-hole.

5. The solid electrolytic capacitor according to claim 2, further comprising:

a via conductor that penetrates the insulating portion in the thickness direction, and is electrically connected to the cathode layer.

6. The solid electrolytic capacitor according to claim 1, further comprising:

a through-hole conductor that penetrates the columnar layer in a thickness direction.

7. The solid electrolytic capacitor according to claim 6, wherein the through-hole conductor is on at least an inner wall surface of a through-hole that penetrates the columnar layer in the thickness direction, and is electrically connected to the anode plate on the inner wall surface of the through-hole.

8. The solid electrolytic capacitor according to claim 7, further comprising:

a via conductor that penetrates the insulating portion in the thickness direction, and is electrically connected to the cathode layer.

9. The solid electrolytic capacitor according to claim 1, wherein the conductor layer includes a metal layer containing a metal filler.

10. The solid electrolytic capacitor according to claim 1, wherein the conductor layer includes a metal layer and a conductive resin layer.

11. The solid electrolytic capacitor according to claim 10, wherein the conductive resin layer is on the second solid electrolyte layer and the metal layer is on the conductive resin layer.

12. The solid electrolytic capacitor according to claim 1, wherein the first insulating material is the same as the second insulating material.

13. The solid electrolytic capacitor according to claim 1, wherein the columnar layer is in contact with the anode plate.

14. The solid electrolytic capacitor according to claim 1, wherein a difference between a coefficient of linear expansion of the columnar layer and a coefficient of linear expansion of the anode plate is 100 ppm/K or less.

15. The solid electrolytic capacitor according to claim 1, wherein an elastic modulus of the columnar layer is preferably 2 Gpa or less.

16. A capacitor array comprising:

a plurality of the solid electrolytic capacitors according to claim 1.

* * * * *